(12) United States Patent
Beutin et al.

(10) Patent No.: US 8,033,719 B2
(45) Date of Patent: Oct. 11, 2011

(54) GAS TURBINE WITH PROTECTIVE SHEATH FOR A PROBE AND METHOD FOR PROTECTING AN INSTRUMENT LEAD WHICH IS LAID IN A PROTECTIVE SHEATH

(75) Inventors: Matthias Beutin, Emmerich (DE);
Gilbert Braun, Herzogenrath (DE);
Holger Eisenlohr, Berlin (DE);
Giuseppe Gaio, Bonn (DE); Frank Günther, Duisburg (DE); Kai-Uwe Rogos, Mülheim an der Ruhr (DE);
Bernd Vonnemann, Gladbeck (DE);
Edmund Zastrozny, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 603 days.

(21) Appl. No.: 11/886,832

(22) PCT Filed: Jan. 16, 2006

(86) PCT No.: PCT/EP2006/050222
§ 371 (c)(1),
(2), (4) Date: Dec. 15, 2008

(87) PCT Pub. No.: WO2006/100132
PCT Pub. Date: Sep. 28, 2006

(65) Prior Publication Data
US 2009/0175316 A1    Jul. 9, 2009

(30) Foreign Application Priority Data

Mar. 23, 2005    (EP) .................................... 05006400

(51) Int. Cl.
*G01K 1/08*    (2006.01)

(52) U.S. Cl. .......................... 374/158; 374/179; 374/208
(58) Field of Classification Search .................. 374/144, 374/147, 158, 179, 208
See application file for complete search history.

(56) References Cited

U.S. PATENT DOCUMENTS

| | | | |
|---|---|---|---|
| 3,278,341 A | | 10/1966 | Gee |
| 4,131,756 A | * | 12/1978 | Smith ........................... 374/144 |
| 4,175,438 A | | 11/1979 | Wenzl et al. |
| 4,747,700 A | | 5/1988 | Lenz et al. |
| 5,348,395 A | | 9/1994 | Corr, II et al. |
| 5,718,512 A | * | 2/1998 | Ngo-Beelmann ............. 374/148 |
| 6,325,535 B1 | | 12/2001 | Gibson et al. |
| 7,517,143 B2 | * | 4/2009 | Bosselmann et al. ......... 374/120 |
| 2008/0295604 A1 | * | 12/2008 | Hoyte et al. ............ 374/E3.001 |
| 2010/0158074 A1 | * | 6/2010 | Fortier et al. ................. 374/208 |

(Continued)

FOREIGN PATENT DOCUMENTS

DE        44 31 291 A1    3/1996

(Continued)

*Primary Examiner* — Brad Bennett

(57) ABSTRACT

The invention relates to a gas turbine, with a flow path for a hot gas, enclosed by a channel wall with at least one measuring probe, arranged in the channel wall, for determination of a parameter of the hot gas, said measuring probe comprising a temperature-resistant measuring tip in contact with the hot gas and a measuring line, arranged outside the flow path in a protective sleeve. According to the invention, such a gas turbine with a structurally uncomplicated protective sleeve for measuring lines from measuring probes, in which the measuring lines can be economically fitted and securely protected from excessively high operating temperatures, may be achieved, whereby the protective sleeve has a flow of coolant running therethrough which may be taken from a coolant supply connected to the protective sleeve.

11 Claims, 3 Drawing Sheets

U.S. PATENT DOCUMENTS

2011/0077895 A1*  3/2011  Muramatsu et al. .......... 702/130

FOREIGN PATENT DOCUMENTS

| | | | |
|---|---|---|---|
| DE | 195 42 464 A1 | 5/1997 | |
| GB | 2 293 923 A | 4/1996 | |
| JP | 08075557 A | 3/1996 | |
| JP | 09209778 A | 8/1997 | |
| JP | 2002081327 A | 3/2002 | |
| JP | 2004076703 A | 3/2004 | |

* cited by examiner

GAS TURBINE WITH PROTECTIVE SHEATH FOR A PROBE AND METHOD FOR PROTECTING AN INSTRUMENT LEAD WHICH IS LAID IN A PROTECTIVE SHEATH

CROSS REFERENCE TO RELATED APPLICATIONS

This application is the US National Stage of International Application No. PCT/EP2006/050222, filed Jan. 16, 2007 and claims the benefit thereof. The International Application claims the benefits of European application No. 05006400.5 filed Mar. 23, 2005, both of the applications are incorporated by reference herein in their entirety.

FIELD OF INVENTION

The invention relates to a gas turbine with a flow path for a hot gas, which is enclosed by a passage wall, with at least one probe which is arranged in the passage wall for determining a parameter of the hot gas, which probe has a measuring tip which is temperature-resistant and in communication with the hot gas, and an instrument lead which is arranged outside the flow path and laid in a protective sheath. In addition, the invention relates to such a protective sheath and to a method for protecting an instrument lead which is laid in a protective sheath.

BACKGROUND OF THE INVENTION

A gas turbine with a measuring arrangement for recording the temperature of a gas which flows in a passage which is circular in cross section, is known from GB 2 293 923 A. For this purpose, a plurality of thermocouples, which are distributed over the circumference of the passage, are installed in the passage wall. In order to protect their electrical instrument leads against the temperatures which prevail outside the passage, these are laid in a hermetically sealed protective environment which is formed from a system of interconnected tubes and branch boxes of stainless steel or aluminum.

At the terminating or connecting points of the tubes to the branch boxes, however, leakages can occur owing to thermal expansions, as a result of which hot ambient air can penetrate into the protective environment, and the insulation of the instrument leads can be subjected to unacceptably high temperatures. This can lead to erroneous measuring results, to defects on the insulation of the instrument leads, or even to the total failure of a probe.

A further disadvantage is the costly construction of tube-like protective sheaths and their sealed connections to the branch boxes in order to form a hermetic protective environment.

Furthermore, a cooled pyrometer for temperature measuring of a combustion hot gas is known from U.S. Pat. No. 5,348,395. The pyrometer comprises a double-sheathed thermoelement which is coolable in the interspace by water. A further cooled probe is known, for example, from U.S. Pat. No. 6,325,535.

SUMMARY OF INVENTION

It is the object of the present invention, therefore, to create a gas turbine of the type referred to in the introduction, with a structurally simple protective sheath for instrument leads of probes, in which the instrument probes are inexpensively laid and securely protected against unacceptably high operating temperatures. It is a further object of the invention to disclose a corresponding protective sheath and a method for protecting an instrument lead which is laid in a protective sheath.

For achieving the object, a gas turbine of the generic type is proposed, in which for introducing a cooling medium into the protective sheath this is fluidically connected to a cooling medium source from which the cooling medium is extractable. Moreover, the objects which relates to the protective sheath and the method are achieved by the features of the claims.

By the invention, it is first proposed to equip a gas turbine of the type referred to in the introduction with a passage system, which is flow-washed by a cooling medium, for the instrument leads of measuring devices or probes of the gas turbine, as the case may be, which is usable for protection of the instrument leads against unacceptably high temperatures which lie above the operating temperatures of the insulation of the electrical instrument leads. During operation of the gas turbine, for thermal protection of the instrument leads, a cooling medium, which is extracted from a cooling medium source which is fluidically connected to the protective sheath, is introduced into the protective sheath which protects against mechanical influences. By means of the invention, the thermal and mechanical requirements with regard to the protection of the instrument leads are achieved separately from each other and not, as previously, by means of a common device.

The passage wall is formed in an annular shape transversely to its longitudinal extent, and has a circumferential surface which faces away from the hot gas and upon which the protective sheath at least partially encompasses the flow path in an annular manner. This enables a simple and inexpensive arrangement of the protective environment.

Moreover, by means of the cooling medium which flows through the protective sheath, the heat energy which acts upon the protective sheath from outside it and which can bring about damage to the instrument leads or their insulation, as the case may be, can be simply, inexpensively and reliably transported away. In this way, the temperature level inside the protective sheath can be held at a temperature value which is harmless, i.e. permissible, for the instrument leads and their insulation.

In the case of a leakage in the protective sheath, regardless of whether this occurs at a critical terminating or connecting point of the protective sheath, or even between them, the penetrating of hot ambient air can be prevented and a more secure operation of the gas turbine can be achieved, since by means of the unsealed point the cooling medium which flows in the protective sheath can flow out as blocking medium. Naturally, the pressure in the cooling medium is greater than the pressure of the ambient air.

Moreover, the cooling medium which flows through the protective sheath protects the electrical instrument leads and cools the protective sheath. The use of cost-effective materials for forming the protective sheath is consequently made possible. Moreover, the costly construction of the protective sheath from tubes and branch boxes and their connections from the prior art can be significantly simplified, which leads to cost saving.

Furthermore, a plurality of probes are provided in the passage wall in the region of the protective sheath, the instrument leads of which extend inside a single protective sheath. Consequently, it is not necessary that each instrument lead is laid in a separate protective sheath.

Moreover, the protective sheath has at least one leadthrough for probes. As a result, the instrument lead or the measuring tip of the probe can be inserted into the protective sheath from outside. Furthermore, this achieves the effect that the probe can be arranged at a desired point between the passage wall and the protective sheath without a separate tubing, which is formed specially for it, having to be used, as in the case of the prior art. The known branch boxes can be dispensed with.

Advantageous developments are disclosed in the dependent claims:

The probe is expediently fastened in the leadthrough in a sealed manner. Penetrating of hot ambient air into the protective sheath is therefore effectively prevented, so that the insulations of the instrument leads are subjected at most to the intended operating temperatures. Moreover, cooling air can be saved because this cannot escape.

The fastening of the probe in the leadthrough for cooling medium, however, can also be permeable so that cooling medium can flow out at this point. The production costs for such a fastening are comparatively low, since fewer components are required for a leadthrough which is permeable by cooling medium than for a sealed design. Moreover, these can be manufactured with larger tolerances than in the case of a hermetically sealed protective sheath. Consequently, production costs and also installation costs for such a development are lower. In addition, if necessary, the probe can additionally be cooled in order to widen the range of application of the probe.

An especially preferred development provides that the instrument leads are spaced away from the inner wall of the protective sheath by means of distance elements. As a result, the instrument leads are prevented from lying against the protective sheath. Furthermore, the instrument leads are flow-washed all round by cooling medium as a result of this, so that an especially safe operation of the measuring device, and consequently also the gas turbine, is made possible. The distance elements are manufactured from a material which poorly conducts heat.

Especially advisably, the feed of the cooling medium is carried out at the lowest point of the protective sheath, and the discharge of the cooling medium is carried out at the highest point of the protective sheath. This leads to an especially effective cooling of the protective sheath. The feed passage of the cooling medium simultaneously serves as a guide element for the instrument leads to a measuring, controlling or evaluating unit of the gas turbine.

The flow path can be formed inside a combustion chamber, inside a turbine unit or inside an exhaust gas diffuser or exhaust gas casing of a stationary gas turbine, as the case may be. The invention is especially advantageously usable if the probes are thermocouples, especially exhaust gas thermocouples. As a protective sheath which is inexpensive and simple to install, this can be a metal, flexible sleeve. In comparison to the prior art, in which the instrument leads are guided through bent tubes, the bending of steel tubes can be dispensed with on account of the flexible sleeve as a protective sheath.

BRIEF DESCRIPTION OF THE DRAWINGS

The invention is described with reference to a drawing. In the drawing.

DETAILED DESCRIPTION OF INVENTION

Figure 1:
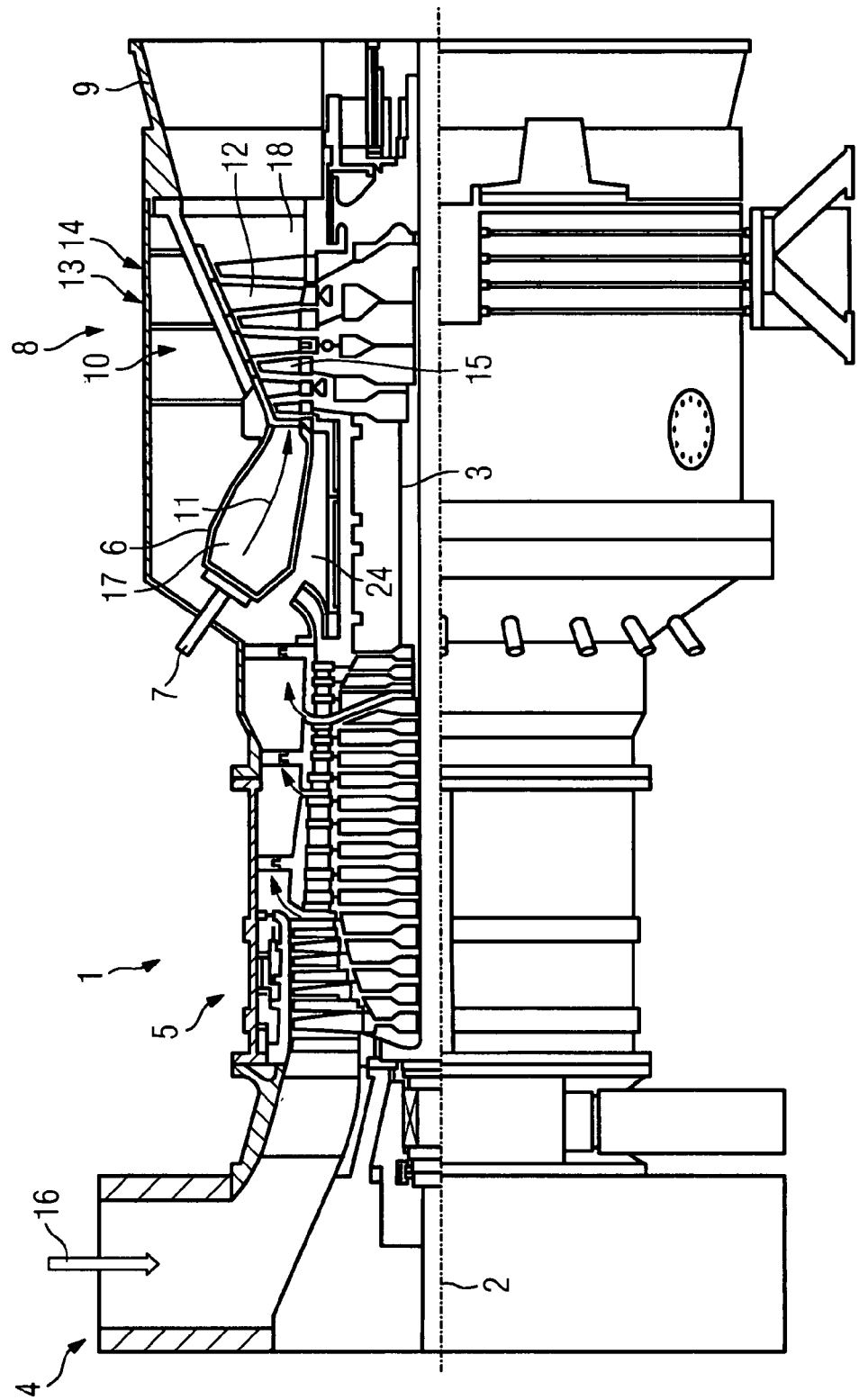
FIG. 1 shows a stationary gas turbine in a longitudinal partial section.

FIG. 1 shows a gas turbine 1 in a longitudinal partial section. Inside, it has a rotor 3, also referred to as a turbine rotor, which is rotatably mounted around a rotational axis 2. An intake casing 4, a compressor 5, a toroidal annular combustion chamber 6 with a plurality of coaxially arranged burners 7, a turbine unit 8, and the exhaust casing 9, are arranged in series along the rotor 3. The annular combustion chamber 6 in this case forms a combustion space 17 which communicates with an annular hot gas passage 18. Four turbine stages 10, which are connected one behind the other, form the turbine unit 8 there. Each turbine stage 10 is formed from two blade rings. A row 14 which is formed from rotor blades 15 follows a stator blade row 13 in the hot gas passage 18, as seen in the flow direction of a hot gas 11. The stator blades 12 in this case are fastened on the stator, whereas the rotor blades 15 of a row 14 are attached on the rotor 3 by means of a turbine disk. A generator or a driven machine (not shown) is coupled to the rotor 3.

Figure 2:
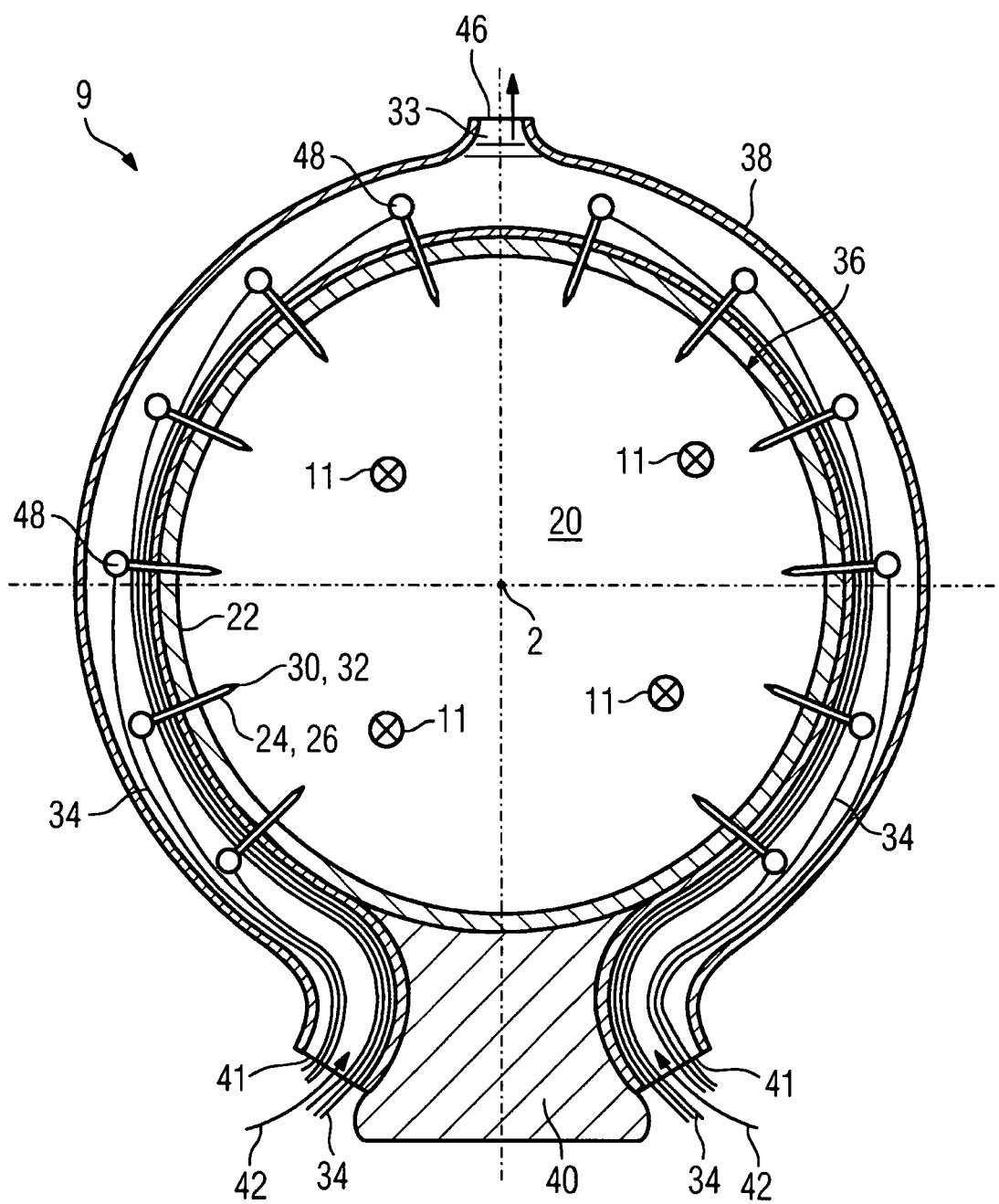
FIG. 2 shows a cross section through an exhaust gas casing of a gas turbine with a measuring arrangement.

FIG. 2 shows the exhaust casing 9 of the gas turbine 1 in cross section. The flow path 20 for the hot exhaust gas is encompassed by a circular passage wall 22 through which the hot gas 11 which is expanded in the turbine unit 8 is discharged as exhaust gas. A plurality of, for example twelve, thermocouples 24 are arranged as probes 26 in the exhaust gas casing 9 and, in a distributed manner over the circumference of the passage wall 22, lie on a circle which is concentric to the rotational axis 2. Each of the probes 26 comprises a measuring tip 30 which is temperature-resistant with regard to the temperature of the hot gas 11, and on the end 32 of which a parameter of the hot gas 11, for example its temperature, can be recorded. Furthermore, the probes 26 comprise electrical instrument leads 34, the insulation of which is temperature-resistant with regard to an outside temperature which prevails on the outer side 36 of the passage wall 22. In order to protect the insulations of the instrument leads 34 against damage and defects as a result of the outside temperature which is heated up by the hot gas 11 or exhaust gas, as the case may be, these extend in a protective sheath 38. Similar to the probes 26 which lie on a circle, the protective sheath 38 extends at least in sections in an annular manner around the flow path 20 of the gas turbine 1. The instrument leads 34 of a plurality of probes 26 can extend inside the protective sheath 38.

The sleeve-form protective sheath 38 is connected to a cooling medium source, for example on both sides of a pedestal 40 of the gas turbine 1. The cooling medium source, for example, can be the compressor 5 or an external source. A cooling medium 42 which is made available by the cooling medium source, preferably cooling air which is compressed by the compressor 5, is fed to the respective end 41 of the protective sheath 38 during operation of the gas turbine 1. The cooling medium 42 is blown into the protective sheath 38 for cooling of the protective sheath 38 and for thermal protection of the instrument leads 34 which extend therein, and then, at the approximately highest lying point 33 of the protective sheath 38, can be discharged through a suitable outlet opening 46 or also blown out into the ambient air.

The protective sheath 38 has a leadthrough 48 for each probe 26, from which the respective measuring tip 30 projects to such an extent that it is in communication with the hot gas 11. In this case, the leadthrough 48 and the measuring tip 30 for example are screwed together in a sealed manner in order to save cooling medium.

Alternatively to a sealed threaded connection, the leadthrough 48 and the measuring tip 30 can also be interconnected so that cooling medium 42 can flow out at this point in a predetermined, i.e. limited amount, in order to further reduce, if necessary, the temperatures which prevail around the measuring tip 30. This leads to a broadening of the range of application of the probe 26. If the probe 26 is formed as a thermocouple 24, for this case the measured values which are sensed are to be correspondingly corrected.

Instead of an exhaust gas flow, a hot gas flow in a combustion chamber, especially a tubular combustion chamber, can also be monitored if the probes 26 are designed with such a protective sheath 38 through which cooling air or another suitable cooling medium 42 can flow.

Figure 3:
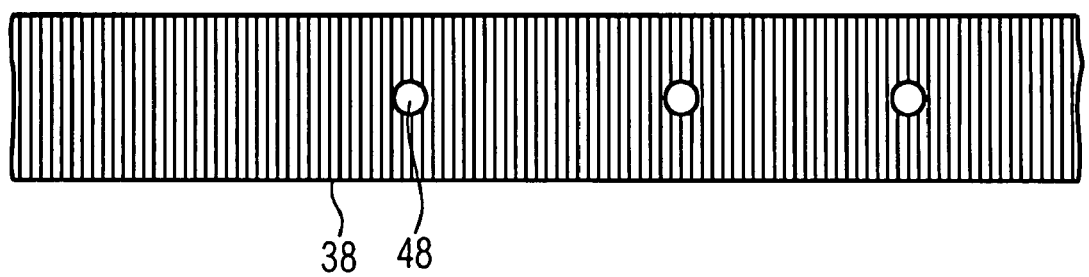
FIG. 3 shows a development of a protective sheath for a measuring arrangement and FIG. 4 shows a distance element.

In FIG. 3, for example the developed protective sheath 38 of the gas turbine 1 is shown. This can be an inexpensive aluminum corrugated tubular sleeve. The leadthroughs for the probes 26 can be arranged both on the side on the protective sheath 38 (FIG. 2) and in the regions of the protective sheath 38 which lie on the outer side 36 or even on the circumferential face of the passage wall 22 (FIG. 3).

Figure 4:
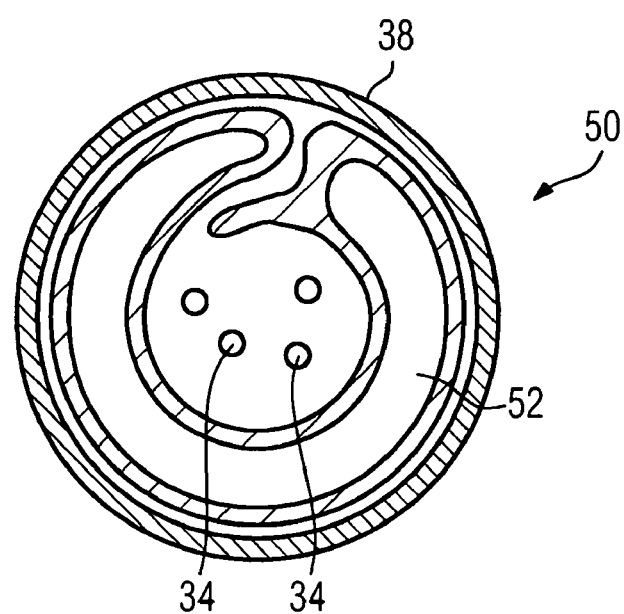

During the installing of the probes 26 in the gas turbine 1 and the installing of the instrument leads 34, moreover, clamp-like distance elements 50 (FIG. 4), which keep the instrument leads 34 at a distance to the wall of the protective sheath 38, can be inserted in the protective sheath 38, i.e. the distance elements 50 center the instrument leads in the protective sheath 38 without the washing of the protective sheath 38 with cooling medium 42 being limited, since they have a recess 52 through which the cooling medium 42 can flow. Such the instrument leads 34, for example approximately every 10 to 15 cm.

The invention claimed is:

1. A gas turbine, comprising:
a passage wall formed in an annular shape transverse to a longitudinal axis of the turbine that forms a flow path for a hot gas; and
a plurality of probes arranged in the passage wall for determining a parameter of the hot gas where each probe has
a temperature-resistant measuring tip in communication with the hot gas, and
an instrument lead arranged outside the flow path and laid in a protective sheath,
wherein the passage wall has a circumferential surface which faces away from the hot gas and upon which the protective sheath at least partially encompasses the flow path, and where the protective sheath is fluidically connected to an extractable cooling medium source,
wherein the protective sheath has a lead through for probes where each of the probes are fastened.

2. The gas turbine as claimed in claim 1, wherein the probe is fastened in the leadthrough in a sealed manner.

3. The gas turbine as claimed in claim 1, wherein the fastening of the probe in the leadthrough is permeable for cooling medium.

4. The gas turbine as claimed in claim 3, wherein the instrument leads are spaced away from the inner wall of the protective sheath via distance elements.

5. The gas turbine as claimed in claim 4, wherein the feed of cooling medium into the protective sheath is provided at the lowest point of the protective sheath and the outlet of cooling medium is provided at the highest point of the protective sheath.

6. The gas turbine as claimed in claim 5, wherein the flow path is formed inside a combustion chamber of the turbine or an exhaust gas diffuser of a stationary gas turbine.

7. The gas turbine as claimed in claim 6, wherein the probes are thermoelements.

8. The gas turbine as claimed in claim 7, wherein the probes are exhaust gas thermoelements.

9. The gas turbine as claimed in claim 8, wherein the protective sheath is a flexible sleeve.

10. The gas turbine as claimed in claim 9, wherein the flexible sleeve is a metal sleeve.

11. The gas turbine as claimed in claim 10, wherein the cooling medium is cooling air.

\* \* \* \* \*